United States Patent [19]

Tsujimoto et al.

[11] Patent Number: 4,925,718
[45] Date of Patent: May 15, 1990

[54] SHEET-SHAPED MOLDING MATERIAL

[75] Inventors: Yasuhiro Tsujimoto; Masayuki Kurita; Minoru Miki, all of Shimizu, Japan

[73] Assignee: Takeda Chemical Industries, Ltd., Osaka, Japan

[21] Appl. No.: 291,305

[22] Filed: Dec. 28, 1988

[30] Foreign Application Priority Data

Dec. 28, 1987 [JP] Japan ................... 62-333755

[51] Int. Cl.⁵ .......................... B32B 1/04; B32B 3/04; B32B 3/18
[52] U.S. Cl. ......................................... 428/68; 428/76; 428/121; 428/124; 428/480
[58] Field of Search ................. 428/121, 124, 88, 480, 428/68, 70, 76

[56] References Cited

U.S. PATENT DOCUMENTS

| | | | |
|---|---|---|---|
| 3,301,257 | 1/1967 | Crowe, Jr. et al. | 428/121 X |
| 3,932,980 | 1/1976 | Mizutani et al. | 53/111 |
| 4,190,010 | 2/1980 | Bibby | 428/121 X |
| 4,278,719 | 7/1981 | Sarnecki | 428/124 X |
| 4,385,090 | 5/1983 | Sims | 428/121 |

Primary Examiner—William J. Van Balen
Attorney, Agent, or Firm—Wenderoth, Lind & Ponack

[57] ABSTRACT

A sheet-shaped molding material, comprising carrier films having therebetween a paste-like curable material including resin, filler, and reinforcing solid material of glass fiber. The elongation percentage of the carrier films is 1% lower with respect to the tension of 20 kg per m, to remove the curvature and bending of the material caused during the winding, and also to equalize the thickness of the material.

5 Claims, 5 Drawing Sheets

SHEET-SHAPED MOLDING MATERIAL

BACKGROUND OF THE INVENTION

The present invention relates to a sheet-shaped molding material, and more particularly, to a sheet-shaped molding material wherein both the upper and lower faces of a solid material such as glass fibers or the like have a paste-shaped material such as resin or the like thereon which is covered with carrier films which do not extend easily. The molding material may be wound up in a roll shape around a cylindrical core pipe for transportation and storage, the carrier film being adapted to prevent the sheet-shaped molding material from being bent, curved and so on in the width direction in the wound condition so as to retain a planar shape.

Conventionally, a soft sheet-shaped molding material which adheres to carrier films, a compound of paste-shaped material chiefly composed of the resin, and glass fibers retains its shape with difficulty immediately after manufacture. In particular, various problems are caused in the case where the sheet-shaped molding material continuously wound the cylindrical core pipe upon transportation and storage.

Firstly, conventional films made of polyethylene, polypropylene is used as the carrier film. This type is comparatively large in elongation percentage with respect to tensile force to be applied thereto. The carrier film is required to be strongly wound to some extent in the winding operation, since the winding section of a roll does not become truly round because of weak winding force. Thus, the carrier film is normally wound through the tensile force of 20 kg or more per meter. Upon application of such tensile force, the carrier film in contact against the compound extends, but both the end portions, also known as ear portions, of non-contact in the width direction do not extend, so that the film carrier is bent inwardly when it is wound around the core pipe A as shown in FIG. 9. Also, the film F which is in contact with the compound C is wetted in styrene which is a component of compound C so as to be extended, while the ear portion F-a of non-contact is not extended as shown hereinabove and is likewise bent inwardly as shown in FIG. 9. The so-called "ear cramp" phenomenon causes bending of both the end portions inwardly in the manner as described hereinabove, so that the central portion in the width direction is curved outwardly, and the face does not become flat as shown in FIG. 10. The curvature is not easily removed so as to restore the original shape during the use of the material after maturation. When the film is forced to be restored to become flat, the ear portions may be cut off or injured. Moreover, it is inconvenient in that the film can not be passed into an automatic cutting machine for cutting the sheet-shaped molding material during use because of the curvature of the film.

Secondly, when the film is extended because of the tensile force during the winding operation, the compound disposed near the core pipe becomes thinner, thus making it impossible to provide equal thickness.

Thirdly, as mentioned above, one roll is 150 through 160 kg at its limit, with 100 kg being normal in the use of the conventional carrier film, because the wound molding material is curved, the thickness is hard to equally retain, and so on. However, when the winding weight of one roll is small, exchanging of the roll during the molding requires more time and more labor, thus resulting in a problem of productivity. The number of rolls to be used is increased when a molding of large size is applied to be pressed even on the part of the user who manufactures the products by the use of this type of molding material. Accordingly, it is demanded that the weight of the one roll be increased. The press molding, which uses a molding material such as SMC, TMC, BMC or the like is becoming main stream, replacing the hand lay up or spray up methods requiring more labor, due to a desire to control recent higher personnel expenses. As the moldings become as large in size as a bathtub, water-proof pan, bathtub with wash place attached thereto and so on, the one piece becomes large in size, with molding material required to be wider and thicker. However, in the case of the TMC of thickness in the width direction, the weight per unit area becomes larger, and the thickness is hard to be equalized, with the material being hard to be restored when it has been curved, so that the winding method is not adopted with the TMC molding material of conventional construction. Thus, the accommodation to the sheet-shaped encasing has a problem, because the productivity is lower and the demand for larger size is hard to fulfill.

Fourthly, as the paste-shaped material immediately after the manufacturing operation is extremely soft, it may have a problem of being forced out from both ends of the carrier on both the upper and lower faces in the winding operation. Particularly, when the tensile force becomes larger, and the winding weight becomes larger, leaking from both ends increases, with the inconvenience that it becomes difficult to keep the thickness uniform in the width direction.

SUMMARY OF THE INVENTION

Accordingly, the present invention has been developed with a view to substantially eliminating the above discussed drawbacks inherent in the prior art sheet-shaped molding material. An essential object of the present invention is to provide a sheet-shaped molding material including a molding material such as SMC (sheet molding compound), TMC (thick molding compound), BMC (bulk molding compound), and a pair of carrier films which are covered onto the top and bottom planes of the molding material, wherein the carrier film, whose tensile force and the elongation with respect to styrene are smaller, is used so as to remove the curvature and bending caused during winding, and also, to equalize the thickness, thus making it possible to increase the winding weight.

Another important object of the present invention is to provide a sheet-shaped molding material, wherein the winding weight may be increased, thus making it possible to have a bigger size sheet-shaped molding material to be wound into one roll, and particularly to effect the winding manufacturing of TMC which is thick and wide.

A further object of the present invention is to provide a sheet-shaped molding material, wherein both the ends of the carrier film in the width direction are bent so as to prevent the leaking of the compound.

In accomplishing these and other objects, according to the present invention, in an arrangement for winding the sheet-shaped molding material around a cylindrical core pipe, the sheet-shaped molding material with both the upper and lower faces of the compound between a paste-like material made of a mixture of resin, filler and so on, and a solid material such as glass fiber and so on being grasped with carrier film, the carrier film of 1% or lower in elongation percentage with respect to tension of 20 kg per m and/or of 3% or lower in elongation percentage when it has been wetted in styrene is used as a carrier film of at least a single face.

A film made of polyester (PET), nylon, cellulose acetate, cellophane, extended polypropylene, polystyrene, polyvinylidene chloride, polyvinyl alcohol, paper and so on is suitably used as a carrier film which is low in elongation, percentage. The carrier film may be placed in contact with the compound. Or the carrier film may be previously laminated with the film which is in contact with the compound before being used. In this case, these films have an advantage of being easily peeled off from the compound when the compound is used. Polyethylene, polypropylene or the like is suitably used as a film which is in contact against the compound. When the thickness of the film is made 10 through 50 $\mu$ or so, the film made of polyester, nylon and so on which is used as the carrier film which is low in the elongation percentage of the outer layer is preferred to be 5 through 50 $\mu$ or so in thickness.

The carrier film may have the surplus portion folded together in the same direction so as to prevent the compound from leaking sideways, the surplus portion being extended from both ends in the width direction of the compound.

The thickening agent made of MgO paste (magnesia paste) and various types of coloring agents made of liquid are mixed with compound liquid. Thus the compound of the sheet-shaped molding material is composed of, as a paste-shaped material, a liquid resin such as, unsaturated polyester resin, polystyrene or the like, a liquid styrene monomer calcium carbonate aluminum hydroxide or the like, zinc stearate particles, calcium stearate or the like, BPO (benzoyl peroxide) as of liquid or paste, a catalyst made of TBPB (t-butyl perbenzoate) or the like, HQ (hydro quinone) particles and a stabilizer such as PBQ (parabenzoquinone) or the like. The glass fiber which is used as a reinforcing material for a solid material to be mixed with the paste-like material is glass roving of 12 $\mu$, TEX 4630 type cut into a given length of " or so.

The deformation by the extension of the carrier film to be caused during the winding is controlled by the winding operation in the roll shape with both the faces of the compound being covered with the carrier film, resulting in the fact that the winding weight can be increased from the conventional 100 kg to 1,000 kg. Needless to say, it may be applied to the thin SMC, but it may be applied even to the case where the TMC is of a thickness (5 through 10 mm or so) of approximately three times as much as the SMC. The large sized sheet-shaped molding material composed these kinds of SMC, TMC may be adopted ideally for the materials of the large sized moldings for the various applications. For example, housing facilities of bathtubs, water-proof pans, water tank panels, balconies and so on, automobile accessories e.g. air spoiler, air intake, roof, side panel, engine hood, and so on, chair, trays, parabolic antennas and so on may be manufactured suitably.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
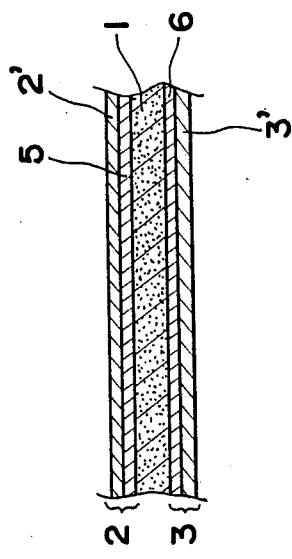
FIG. 1 is a cross-sectional view of a sheet-shaped molding material in a first embodiment of the present invention.

Before the description of the present invention proceeds, it is to be noted that like parts are designated by like reference numerals throughout the accompanying drawings.

Referring to FIG. 1, there is shown a cross-section in a first embodiment of a sheet-shaped molding material to be wound up into a roll in accordance with the present invention, which generally includes a compound 1, and a pair of carrier films 2, 3 or cover sheets for grasping both the upper, lower faces of the compound 1. The carrier films 2, 3 are extended excessively at both of their ends with respect to the width direction of the compound 1, and the extended end portions 2a, 3a thereof are piled up, as shown in the drawing, to be folded on the top face side to form the ear portions 4, 4 of both the ends so as to close both the ends in the width direction of the compound 1 for preventing the sideways leakage of the compound 1. The compound comprises a paste-like material including a paste-like curable material including a mixture of resin, bulking agent and the like, and a reinforcing solid material of glass fiber and the like, which is a molding material such as SMC, TMC, BMC.

A film which is not easy to extend and is 1% or lower in the elongation percentage at a tension of 20 kg/m per unit width, and/or 3% lower in elongation when it has been wetted in styrene, is used as the carrier films 2, 3. Concretely, films 2, 3 made of polyester (PET), nylon, cellulose acetate, cellophane, extended polypropylene, polystyrene, polyvinylidene chloride, polyvinyl alcohol, paper and so on are employed as the carrier film.

In the embodiment shown, the carrier films 2, 3 of both the upper, lower faces are respectively formed of films small in elongation percentage, but only the single face for each of the carrier films 2, 3 is able to be formed of a film small in elongation percentage.

Figure 2:
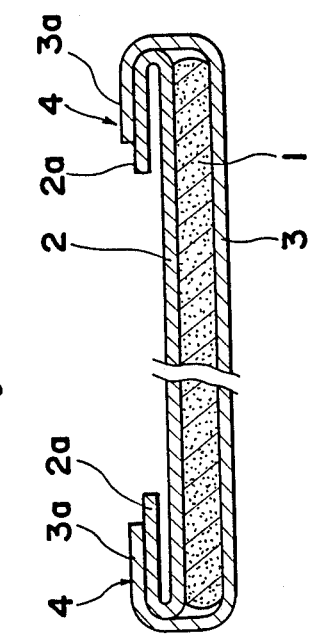
FIG. 2 is a cross-sectional view of a sheet-shaped molding material in a second embodiment thereof.

A sheet-shaped material shown in FIG. 2 shows a second embodiment of the present invention, wherein a two-layer laminate film, with films 5, 6 of polyethylene or polypropylene being applied to films 2', 3' each being low in elongation percentage on the side of the contact with the compound 1, is used as carrier films 2, 3, so that the user may easily peel off the carrier films 2, 3 during the use of the molding material.

The laminate films 2, 3 have the films 5, 6 of the polyethylene, polypropylene made into two layers by application of bonding agent after the manufacturing of films 2', 3'. The inner layer of the laminate films is 10 through 50 μ or so in the thickness, while the thickness of the outer-layer is 5 through 50 μ on the employment of a film made of polyester, nylon and so on.

Figure 3:
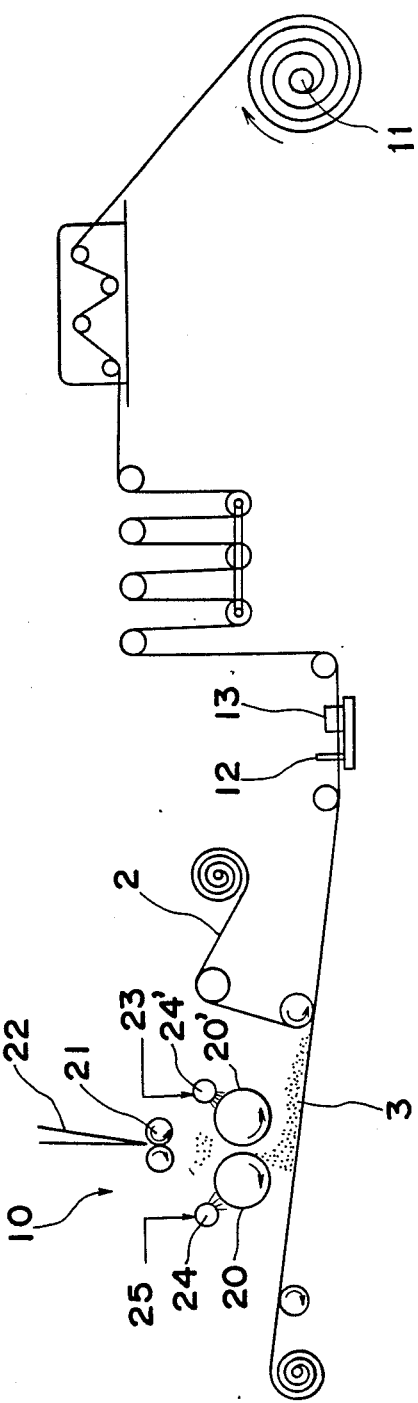
FIG. 3 is a view schematically showing an arrangement, related to the present invention, of the manufacturing process of the sheet-shaped molding material.
Figure 4:
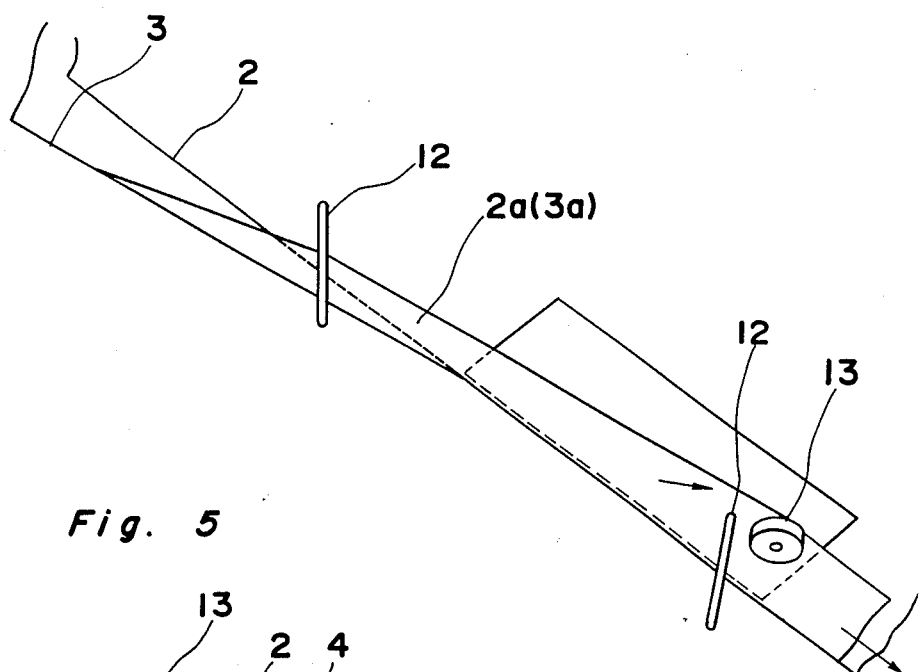
FIG. 4 is a schematic perspective view showing a mechanism for folding the end of a carrier film to be employed in the arrangement of FIG. 3.
Figure 5:
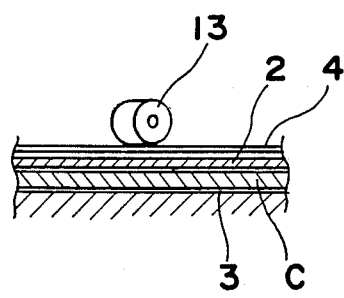
FIG. 5 is a cross-sectional view showing the folding condition by a depressing roller employed in the arrangement of FIG. 3.
Figure 6:
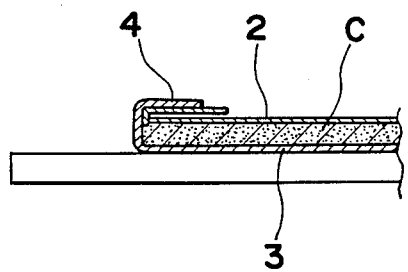
FIG. 6 is a cross-sectional view of a sheet-shaped molding material folded.
Figure 7:
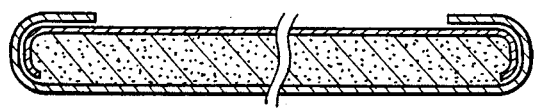
FIG. 7 is a cross-sectional view of a sheet-shaped molding material showing the other folding method.
Figure 9:
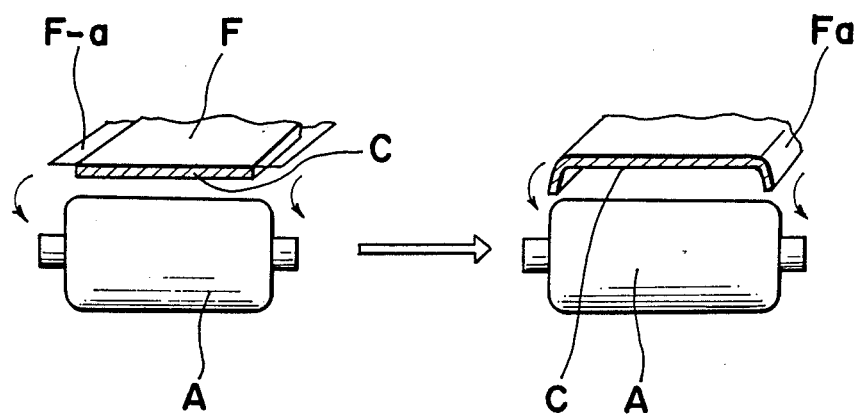
FIG. 9 is a view showing a problem to be caused during the roll winding by the conventional molding material.
Figure 10:
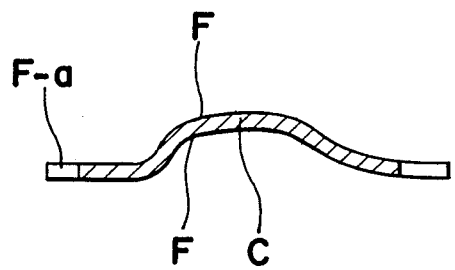
FIG. 10 is a cross-sectional view showing the conventional curved molding material.

The sheet-shaped molding material shown in FIG. 1 and FIG. 2 respectively prevents both ends of the carrier films 2, 3 from being folded, and compound 1 from protruding from both ends in the width direction thereof as described hereinabove. The folding means is employed during transport to a winding step for the winding operation into a roll shape by a cylindrical core pipe 11 from an impregnating step. In the impregnating step, the upper and lower carrier films 2, 3 (or carrier film made into two layer shape with the laminate film) have compound 1 impregnated therein by the impregnation apparatus 10 and then the resultant assembly is passed to a winding step for winding in the roll shape by the cylindrical core pipe 11, as schematically shown in FIG. 3. As shown from FIG. 4 to FIG. 6, the folding means has a bending rod 12 disposed to upwardly bend both the ends 2a, 3a of the carrier films, 2, 3 together, has a depressing roller 13 disposed to downwardly bend both the bent ends 2a, 3a. Both the ends 2a, 3a piled up are folded back on the top face of the top face carrier film 2 to form an ear 4. The length of the ear 4 folded back is approximately 10 cm, with the width of the compound 1 being 100 cm. The shape of the folded back portion in both ends of the carrier films 2, 3 is not restricted in the embodiment, and may be formed as shown in FIG. 7, with a closing portion having only to be so formed that the compound 1 may not protrude from both ends of the carrier films 2, 3.

As schematically shown in FIG. 3, in the impregnating apparatus 10, above a pair of impregnation rollers 20, 20', the glass roving 22 is cut into glass fibers of 1" in size by a glass roving cutter 21 so as to be dropped over the impregnation rollers 20, 20'.

Figure 11:
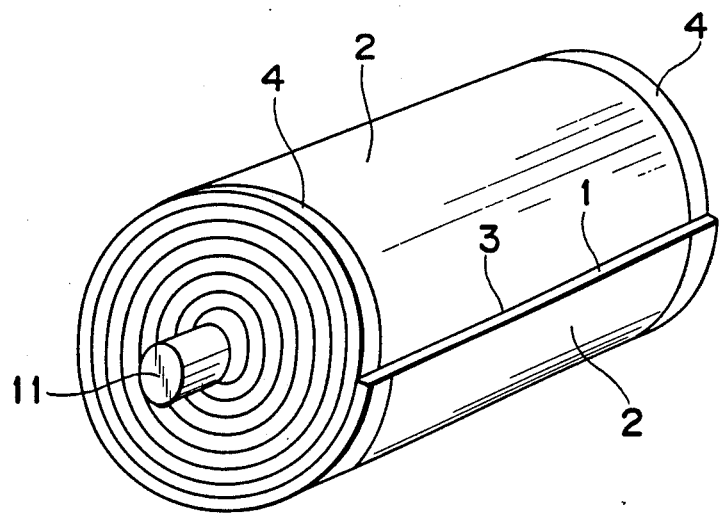
FIG. 11 is a perspective view showing a roll of a sheet-shaped molding material to be manufactured.

Paste-like material 23 is scattered by pipes for supply use 24, 24' on the surface of the impregnation rollers 20, 20', so that the glass fibers are impregnated with the paste-shaped material 23 in passing through the gap of the rollers 20, 20' for impregnation use so as to downwardly move the impregnated compound along the face of the rollers 20, 20' for dropping it over the lower face carrier film 3 fed into the lower position. Then, it is covered with the upper face of carrier film 2, and is transported into a roll winding position on the side of the low stream so as to be wound by the cylindrical core pipe 11 to provide a roll as shown in FIG. 11.

In the paste-like material which is composed of the compound 1, the thickening agent is made of MgO paste (magnesia paste) and various types of coloring agents made of liquid are mixed with compound liquid composed of an unsaturated polyester resin, a liquid resin such as a styrene solution of polyethylene or the like, liquid styrene monomer calcium carbonate particles, aluminum hydroxide or the like, zinc stearate particles, calcium stearate or the like, BPO (benzoyl peroxide) as liquid or paste, TBPB (t-butyl perbenzoate), or the like, HQ (hydroquinone) made of particles and PBQ (parabenzoquinone) or the like.

(Experiment Example)

TMC of 1 m in product width, 9 kg per m×m in unit weight is wound for 100 m (900 kg in weight) around an FRP-made core pipe of 25 cm in diameter. The product is cut off 1 m by 1 m after the aging completion so as to measure the weight, and at the same time, the observe the "ear cramp" condition of the appearance.

The component of the product compound is as follows.

Polymal 6409 (unsaturated polyester resin made by Takeda Chemical Industries, Ltd.): 100 parts by weight Flowsen UF-20 (powder polyethylene made by Iron Chemistry Company, Ltd.): 5 parts by weight Tertiary butyl peroxybenzoate (organic peroxide): 0.01 parts by weight Parabenzoquinone (stabilizer): 0.01 parts by weight Zinc stearate acid (inner mold releasing agent): 3 parts by weight Super SS (calcium carbonate, made by Maruo Calcium Company, Ltd.): 100 parts by weight Glass Fiber SM-14(1") (roving glass made by Nippon Glass Fiber Company, Ltd.): 90 parts by weight Two kinds of a case (A), where the conventional polyethylene film is used, and a case (B), where a carrier film of the present, invention is used, are made as a carrier film adhering to both the upper and lower faces (outer side and inner side) of the sheet of compound.

Conventional embodiment (A) . . . The outer side (top face of FIG. 1 and FIG. 2) is 35 μ polyethylene. The inner side is 35 μ polyethylene.

Present invention embodiment (B) . . . The outer side is 12 μ polyester, with the polyethylene side in contact against the compound by the laminate of 30 μ polyethylene. The inner side is 40 μ polypropylene.

The comparison between the two types of products of the conventional embodiment (A) and the present invention embodiment (B) is as follows.

Outer appearance check:

Conventional embodiment (A) . . . The "ear cramp" is worse. When the product is made flat upon application of load so as to pass through a cutting machine, the product is broken from the ears thereof before it is caused to pass through the cutting machine.

Present invention embodiment (B) . . . As the "ear cramp" is removed, the product becomes flat without application of the force when the product is unwound, thus resulting in successful cutting into the given size.

Figure 8:
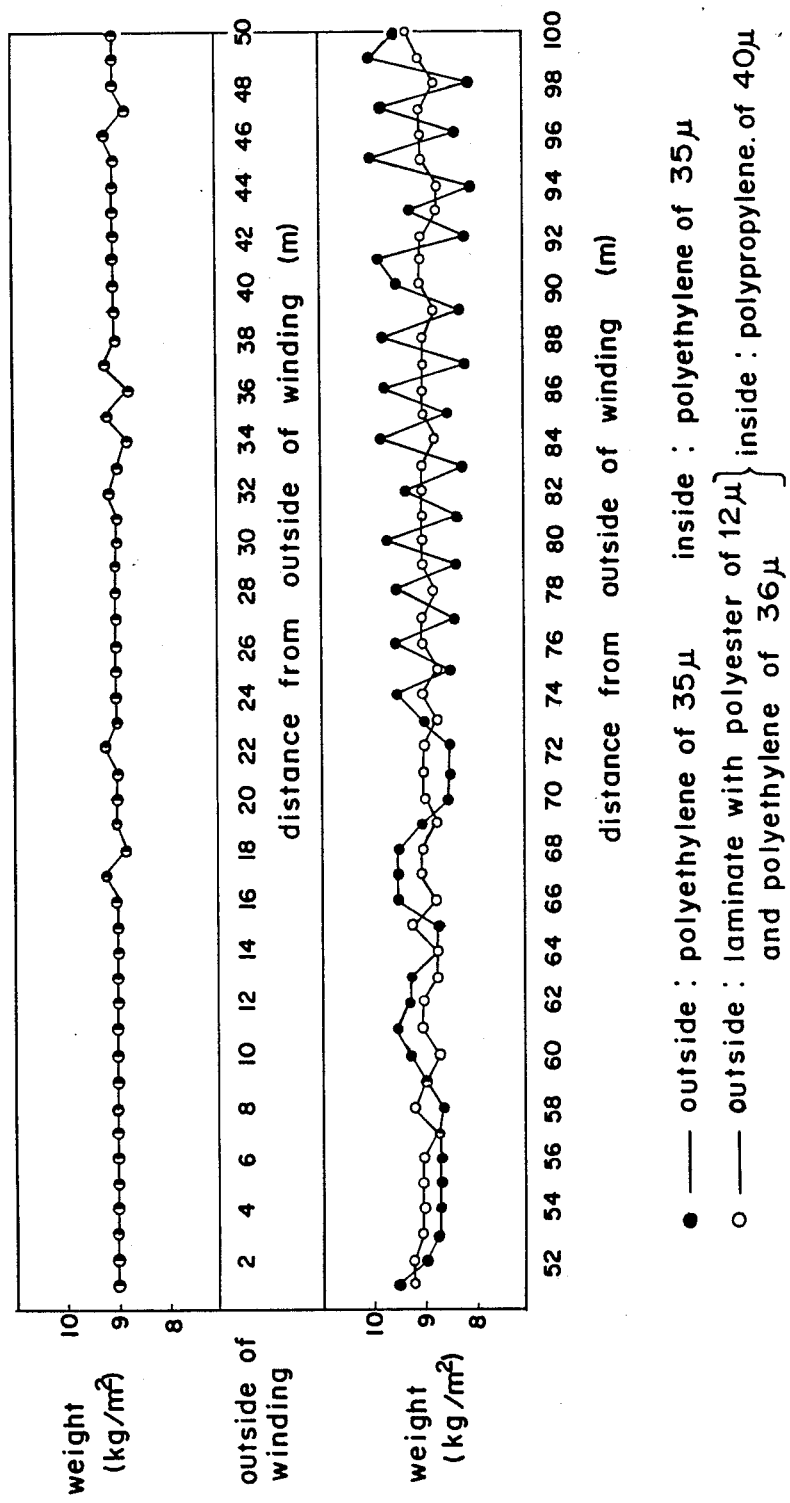
FIG. 8 is a graph showing the experimental results through comparisons between the molding material of the present invention and the conventional molding material.

Weight check of 1 m×1 m cut sample:

The difference between the conventional embodiment (A) and the present embodiment (B) is compared. The sample is cut 1 m by 1 m with the product being rewound so as to measure the weight. The result is shown in FIG. 8, the (B) of the present embodiment being less in weight dispersion.

It is said from the result that the thickness equalization in the width direction and winding direction in the embodiment of the present invention may be almost achieved.

As is clear from the above description, in the sheet-shaped molding material in the present invention, a film of at least single face out of both the upper and lower faces adhering to the compound (molding material) is a film which is hard to extend, i.e., extends with respect to the tensile force during the roll winding and is extremely small in elongation percentage when it has been wetted in the styrene, so that a so-called "ear cramp" may be prevented from being caused during the roll winding. In the roll winding condition, the level degree in the width direction may be retained. The weight of one roll of the roll winding may be increased up to approximately 1,000 kg so as to remove the conventional problem. Accordingly, the thick, wide TMC roll winding, which was impossible to be effected conventionally, may be effected, thus increasing the productivity of the TMC. As the weight of one roll may be increased, the molding material of large size may be provided even in either the TMC or the SMC. The molding material has the various advantages in that it may be used suitably as the molding material for large-sized moldings.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A sheet-shaped molding material to be wound on a roll comprising a sheet of a composition including a paste-like curable material and a reinforcing solid material, and a pair of carrier films covering the entire upper and lower faces of the sheet of composition, at least one of the films having a 1% or lower elongation at a tension of 20 kg/m.

2. A sheet-shaped molding material to be wound as a roll, comprising a sheet of a composition including a paste-like curable material and a reinforcing solid material, and a pair of carrier films covering the entire upper and lower faces of the sheet of composition, at least one of the films having a 3% or lower elongation when one of said films has been wetted in styrene.

3. The sheet-shaped molding material as defined in claim 1 or 2, wherein at least one of the films is made of a member selected from the group consisting of polyester (PET), nylon, cellulose acetate, cellophane, extended polypropylene, polystyrene, polyvinylidene chloride, polyvinyl alcohol, and paper.

4. The sheet-shaped molding material as defined in claim 1 or 2, wherein at least one of the films is formed of two-layers including a first film composed of polyethylene or polypropylene, and a second film low in elongation and bonded to the first film so as to come into contact with the composition sheet through the first film.

5. The sheet-shaped molding material as defined in claim 1 or 2, wherein both ends in the width direction of at least one of the films covering the sheet of composition are folded back onto the other side of the sheet of composition.

* * * * *